Jan. 14, 1969    L. P. LUDWIG    3,421,768
FOIL SEAL
Filed April 20, 1966

INVENTOR.
LAWRENCE P. LUDWIG
BY ial Jan. 14, 1969

United States Patent Office 3,421,768
Patented Jan. 14, 1969

3,421,768
FOIL SEAL
Lawrence P. Ludwig, Fairview Park, Ohio, assignor to the United States of America as represented by the Administrator of the National Aeronautics and Space Administration
Filed Apr. 20, 1966, Ser. No. 545,224
U.S. Cl. 277—25     12 Claims
Int. Cl. F16j *15/42;* F16j *15/40;* F16j *15/54*

ABSTRACT OF THE DISCLOSURE

A circular foil disc mounted on a rotating shaft in close proximity with a spirally grooved plate forms a seal. The fluid to be sealed enters a radial gap between the disc and plate, and the movement of the rotating disc relative to the plate creates a pumping action which prevents leakage.

---

The invention described herein was made by an employee of the United States and may be manufactured and used by or for the Government for governmental purposes without the payment of any royalties thereon or therefor.

The present invention relates to seals and relates more particularly to structures for effecting a seal between relatively moving parts.

Prior devices have not been entirely successful for effecting seals between relatively moving parts because of wear, misalignment and differences in thermal expansion characteristics of the sealing elements such that a tightly closed fluid sealing fit cannot be continuously assured between the relatively moving parts.

It has been a particular problem to retain oil around a rotating shaft which projects from the interior of an oil containing machine housing. In the past, centrifugal slingers have been mounted on the rotating shaft for moving the oil back into the housing during operation of the machine, thereby preventing passage of oil around the rotating shaft. Other sealing devices utilize a contact seal wherein a seal is continuously in sliding contact with the shaft. These and other seals have not been entirely successful in preventing axial movement of the fluid past the seal.

The present invention provides a seal structure wherein the relative movement of the parts is used to effect a seal. The present seal structure provides an absolute seal against through flow of fluids past the seal.

In a preferred form of the present seal, the sealing function is performed between a closely spaced flexible sealing element disposed in closely spaced relation to a grooved or recessed relatively rigid sealing element. The sealing elements are disposed so that any axial flow of the fluid to be sealed must pass through the space between the sealing elements. The sealing elements are further arranged to move relatively. The relative movement of the flexible sealing element over the grooved or recessed sealing element increases the pressure of the fluid in the grooves or recesses to at least the fluid source pressure to effect at least a static condition. In one embodiment the fluid to be sealed is forceably moved in the grooves. In a preferred form of this embodiment the grooves are arranged or directed toward the source of the fluid to be sealed so that the fluid is effectively pumped back to the source.

In a specific embodiment, one of the sealing elements is carried by a housing and the other sealing element is fixed to a shaft for rotation relative to the housing. The space between the sealing elements and in the grooves in the rigid sealing element communicate with a fluid containing chamber in the housing. Portions of the grooves furthest from the chamber lead the remaining portions of the grooves relative to the movement of the flexible sealing elements so that fluid is forced back into the chamber.

An object of the present invention is to provide a new and improved seal between relatively moving parts.

Another object of the present invention is to provide a new and improved seal between relatively moving parts wherein the relative movement between the parts creates an area of high pressure which prevents fluid flow through the seal.

Still another object of the present invention is to provide a new and improved seal between relatively moving parts which is simple in construction, economical of manufacture and is substantially wear free.

Other objects and a fuller understanding of the invention may be had by referring to the following description and claims taken in conjunction with the accompanying drawing in which:

Figure 1:
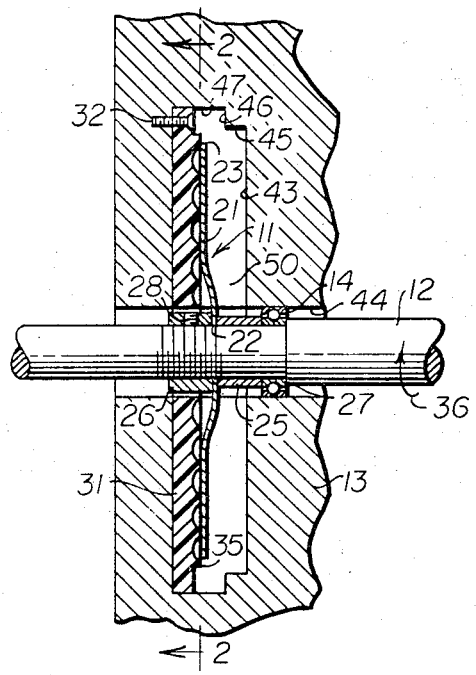
FIGURE 1 is a cross-sectional view, taken along a longitudinal plane, of a machine having a through shaft and utilizing the seal structure of the present invention to seal against an axial flow of fluid out of the machine at the shaft.
Figure 2:
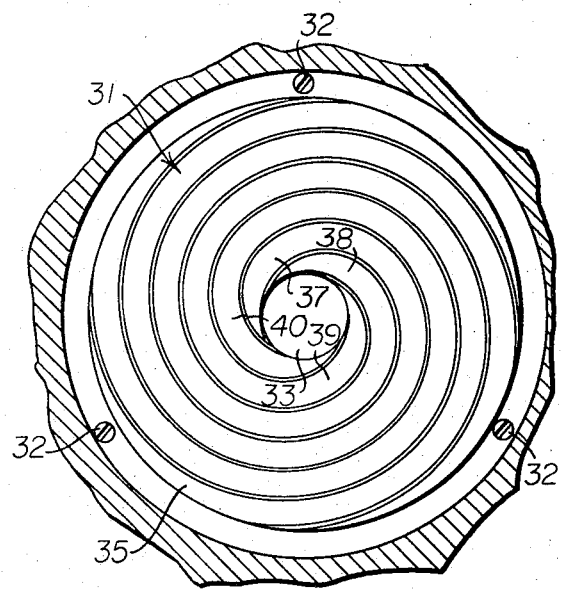
FIGURE 2 is a cross-sectional view, taken along a lateral plane indicated by the lines 2—2 in FIGURE 1, showing the face of a recessed sealing plate used in the seal structure of FIGURE 1.

Referring now to the drawings, a preferred form of the seal of the present invention is designated generally by the reference character 11 in FIGURES 1, 2. The seal 11 is adapted to provide a seal between a shaft 12 rotatably mounted in a machine housing 13 as by the bearing 14. The machine housing 13 is a part of machinery having a protruding, rotating shaft such as a motor, a workpiece working machine or the like.

A flexible seal disc 21 is mounted on the shaft 12 and has a central aperture 22 sized to receive the shaft 12. The disc 21 extends radially from the shaft 12 to an outer peripheral edge 23 which describes a circle concentric with the aperture 22. The disc 21 is fixed to the shaft 12 to rotate therewith by central portions of the disc 21 which are clamped between cylindrical clamping members 25, 26. The clamping member 25 abuts against a bearing half-race 27 of the bearing 14 which prevents movement of the clamping member 25 toward the interior of the machine. The clamping member 26 is threaded on the shaft 12 to clamp the disc central portions tightly against the clamping member 25. A set screw 28 fixes the clamping member 26 to the shaft 13 and prevents a loosening movement of the clamping member 26 to retain the disc 21 rigidly fixed to the shaft 13.

The disc 21 is a flexible member made of a metal foil, preferably No. 304 stainless steel. As an example, in the machine shown having a shaft approximately .438 inch in diameter, a preferred stainless steel disc is 3.75 inches in diameter and is .005 inch thick.

A spirally grooved rigid seal plate 31 is carried by the housing 13 and is fixed to it by conventional fasteners 32. The fasteners extend through apertures in outer mounting flange portions of the seal plate and are threaded into tapped bores in the housing 13. In the seal 11 shown, the seal plate 31 is made preferably of a resinous, synthetic plastic material, for example, Lucite. The plate 31 has a central aperture 33 which axially receives the shaft 12. A raised and grooved face surface 35 extends radially, generally parallel to the disc 21 and is spaced from the disc 21.

Referring to FIGURE 2 the face of the seal plate 31 includes a plurality of spiral grooves or recesses 37–40 which start at 90°, angularly spaced positions around the central aperture 33. The spiral grooves 37–40 spiral away and around the central aperture for 1½ turns (540°) from a one inch inner diameter to a four inch outer diameter in the preferred seal plate shown. The spiral grooves or recesses 37–40 in the plate shown as an example herein are preferably from .007 to .011 inch deep and .12 inch wide. The grooves or recesses are separated by lands .08 inch wide.

An inner annular surface 43 of the machine housing 13 extends radially from an inner surface 44 which defines a shaft receiving bore through the machine housing, to an outer cylindrical surface 45 beyond the outer peripheral edge 23 of the seal disc 21. A radial surface 46 extends further radially outward from the surface 45 and a cylindrical surface 47 extends from the outer perimeter of the surface 46 to an annular surface 48 to which the seal plate 31 is fixed by the fasteners 32.

The machine surfaces 43, 45 and the face surface 35 of the seal plate define a fluid chamber 50 into which the seal disc 21 extends in close proximity to the face surface 35. The surfaces 46, 47 define an annular fluid receiving pocket around the periphery of the seal disc 21.

When no forces are acting on the disc 21, as when the shaft 12 is stationary, the disc 21 extends in a radial plane slightly further spaced from the face surface of the seal plate 31 than is shown in the drawings of FIGURE 1. In the size of seal 11 shown herein as an example, the radially extending space or gap between the disc 21 and the surface of the seal plate is on the order of 0.005 inch when the fluid to be sealed is a liquid and on the order of 0.005 inch when the fluid to be sealed is a gas.

A lubricating fluid or the like which is placed in the chamber 50 enters the narrow radially extending space or gap between the foil disc 21 and the spirally grooved seal plate 31. When the machine is placed in operation and the shaft 13 is rotating, the fluid to be sealed, partially or completely fills the radially extending space between the seal disc and the seal plate. The fluid is prevented from leaking axially past the seal by a pumping action provided by the flexible foil disc moving the fluid in the spirally arranged grooves of the seal plate.

Where the fluid or other material to be sealed at the higher pressure first enters the seal around the outer peripheral edge of the disc 21 in the arrangement shown with the shaft 13 rotating in a clockwise direction as shown by arrow 36 an outwardly pumping direction of the grooves is utilized. The foil disc 21 wiping across the grooves continuously forces the fluid to the outer periphery of the seal plate 31 and continuously pumps the fluid away from the central aperture of the seal plate thereby preventing its egress past the shaft seal 11. The pumping action may be described as outwardly pumping for the arrangement shown wherein the fluid under pressure is on the chamber or right side of the flexible disc 21 as shown in the drawing.

Figure 3:
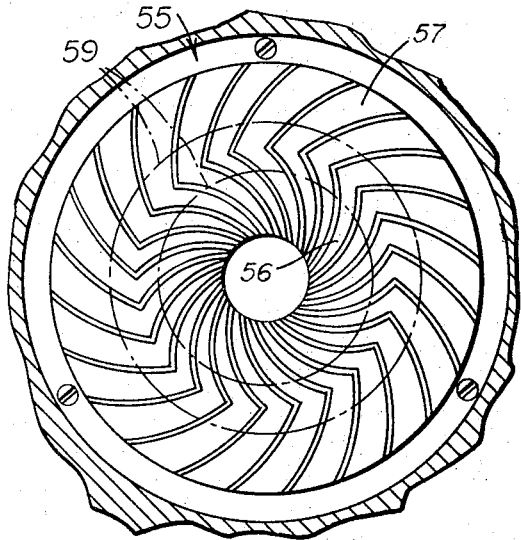
FIGURE 3 is a cross-sectional view, similar to FIGURE 2, showing an alternate sealing plate.

Should the arrangement be reversed wherein the fluid to be sealed at the higher pressure enters the seal through the aperture 33 in the seal plate 31 to the inner peripheral edge of the radially extending space between the disc 21 and the plate 31, then an inwardly pumping arrangement is used to seal against axial movement of the fluid past the disc 21. The inwardly pumping arrangement is provided by reversing the direction of rotation of the the shaft 13 oppositely as shown by the arrow 36 or by reversing the direction of spiral of the grooves 37–40 in the plate 31. In an inwardly pumping arrangement for the direction of shaft rotation shown by the arrow 36 the grooves are arranged to spiral away from the central aperture of the plate in a counterclockwise direction rather than in a clockwise direction as shown. Movement of the flexible disc 21 over the fluid in the grooves forces the fluid toward the center aperture and prevents it from flowing into the chamber 50. In both arrangements, the portions of the grooves closest to the fluid source lag behind the portions of the grooves furthest from the fluid source relative to the movement of the flexible disc 21.

Where the fluid or material to be sealed is in a gaseous or vapor state, an alternate seal plate 55 having a grooved herringbone arrangement shown in FIGURE 3 is utilized.

In the herringbone arrangement, an inner annular portion of the raised face surface of the seal plate 55 contains outwardly pumping grooves 56 and an outer annular portion contains inwardly pumping grooves 57. The outwardly pumping grooves 56 extend from the inner peripheral edge of the seal plate 55 to generally half way between the inner and outer peripheral edges of the seal plate. The inwardly pumping grooves 57 extend from the outer ends of the outwardly pumping grooves to the outer peripheral edge of the seal plate 55.

With the seal plate 55 in the seal assembly of FIGURE 1, a portion of the vapor between the foil disc 21 and the seal plate 31 is condensed on the face surface of the seal plate 55. As the foil disc rotates counterclockwise as seen in FIGURE 3 relative to the seal plate surface, the liquid resulting from the condensed vapor is pumped toward the intersection of the outwardly and inwardly pumping grooves 56, 57 and remains trapped there because the contra pumping action of the grooves. This results in an annular ring or slug of the liquid being trapped where the inwardly and outwardly pumping grooves meet as shown by broken lines 59. The slug of liquid thusly trapped seals against the flow of gases or vapors through the gap between the flexible disc 21 and the seal plate 55.

In its preferred form, as shown in FIGURES 1, 2, the present seal is pressure compensating in that an increase in fluid pressure in the chamber 50 moves the foil disc closer to the grooved seal plate 31 to increase the pumping action of the mechanism thereby adjusting for the pressure increase. Axial growth or other relative movement of the shaft 13 relative to the housing 12 is accommodated by the present mechanism through the flexibility of the foil disc 21. The foil disc 21 allows relative movement in either axial direction. Relative radial growth of the flexible disc 21 and the seal plate 31 is accommodated in the present mechanism by reason of their parallel, radially extending arrangement. Radial movement or growth either of the disc 21 or the plate 31 does not affect the pumping action provided by them.

Figure 4:
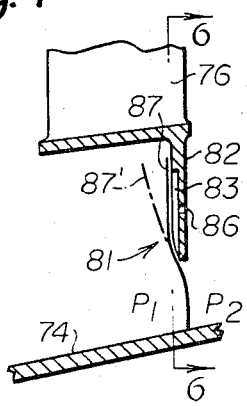
FIGURE 4 is a fragmentary, cross-sectional view, taken along a longitudinal plane, showing an alternate embodiment of the seal structure of the present invention.

Referring to FIGURE 4, another embodiment of the foil seal of the present invention is designated generally by the reference character 71. The foil seal 71 utilizes centrifugal force to actuate a foil disc 72 toward spiral grooves 73 and establishes an inherent increased pumping effort as the speed of rotation of the foil disc 72 increases.

In this arrangement, the foil disc 72 extends radially from a rotating member 74, which, for example, is the rotor of a compressor. The foil disc 72 extends behind the face surface of a rigid, annular seal plate 75 fixed to a stationary member 76, for example, a stator. The seal plate 75 has spiral grooves 73 similar to the grooves in the seal plate 31 described above, except arranged in an inwardly pumping arrangement. The foil disc 72 is placed ahead of the seal plate 75 by bending the foil forwardly whereupon it assumes the angle shown in phantom at 72′ which is its position when stationary relative to the seal plate 75. As the rotor 74 commences rotating, a pumping action is provided by the interaction of the innermost interface portions of the disc and the grooved seal plate surface only. As the speed of rotation increases the disc 72 tends to extend further radially outward by reason of centrifugal force. Its free edge at its perimeter moves from its diverging position relative to the seal plate to a position closer and more parallel to the grooved seal plate surface increasing the interface area in close fluid pumping relation. Thus, as the centrifugal forces increase from increased speed of rotation, the foil disc 72 is actuated toward the spiral grooves 73 and establishes an inherent increased pumping effort.

Figure 5:
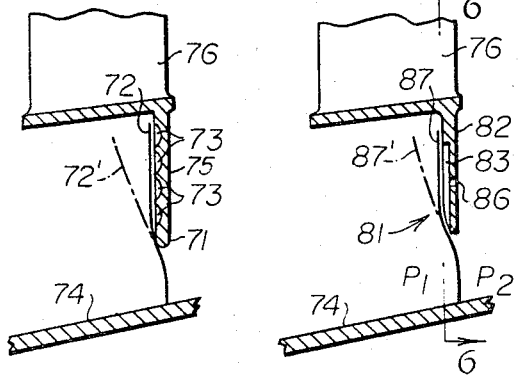
FIGURE 5 is a fragmentary, cross-sectional view, similar to FIGURE 4, of still another alternate embodiment of the seal structure of the present invention; and, FIGURE 6 is a fragmentary view, taken along a lateral plane indicated by the line 6—6 in FIGURE 5 of the sealing structure of FIGURE 5.
Figure 6:
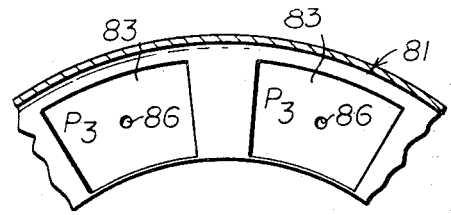

Referring to FIGURES 5 and 6, an alternate seal is designated generally by the reference character 81. In this arrangement, a rigid, annular seal plate 82 includes a plurality of circumferentially spaced and recessed chambers 83 in the face of the seal plate 82. An opening or orifice 86 through the seal plate 82 substantially in the center of each of the recessed chambers 83 provides communication through the seal plate to the high pressure side of the seal plate 82. A flexible foil disc 87 extends radially from the rotor 74 on the fluid side of the seal plate 82 and in superposed relation with the rigid seal plate.

The material to be sealed, such as a gas, in one stage of the apparatus, for example a compressor, is at the highest pressure designated $P_2$ and on the right side of the seal as shown in FIGURE 5. A lower pressure $P_1$ may be outside the compressor such that it is the ambient pressure or it may be the pressure in the next stage of the compressor. The gas to be sealed enters the seal between the flexible disc 87 and the rigid seal plate 82 along an inner peripheral edge of the seal space or gap. There is some pressure drop through the orifices 86 to the chambers 83. As the angular speed of the rotor 74 increases, the foil disc 87 tends to take the more parallel position shown by the solid line 87 instead of the diverging position shown by the broken line 87′ by reason of centrifugal force. This increases the pressure $P_3$ in the recessed chamber 83 until there is a pressure balance between the pressure $P_3$ in the chambers 83 and the pressure $P_2$ of the gas to be sealed. Since this pressure in the recessed chamber 83 approaches the pressure sealed, gas flow through the seal is restricted.

In all of the above seals, the sealing function is provided by close clearance between the flexible foil and the grooved solid surface of the seal plate and the relative motion between the two surfaces. Contact between the surfaces is prevented by a balance between the forces pushing the foil towards the face of the seal plate and the forces in the fluid between the foil and the seal plate. In the seal embodiment 11 shown in FIGURES 1–4, the self-acting or hydrodynamic forces induced in the fluid in the gap between the interface surfaces of the foil and the face plate are in balance with the hydraulic and/or pneumatic forces, depending upon the nature of the fluid to be sealed, pushing the foil toward the seal plate, any mechanical force which may tend to be applied as by the internal resiliency of the flexible foil seal when arranged in an off-set arrangement, and in balance with centrifugal forces as are applied in the arrangement of FIGURE 4. In the arrangement of FIGURES 5 and 6, the hydrostatic or externally pressurized forces are maintained in balance with the centrifugal forces applied, the mechanical forces such as by the tendency of the foil to straighten, and hydraulic and/or pneumatic forces as determined by the nature of the fluid or fluids around the seal.

In all these seal embodiments, the metallic foil seal provides excellent gap control by establishing and maintaining the gap at a minimum value thereby increasing sealing effectiveness. This effective sealing is maintained while simultaneously allowing free axial or radial growth or relative movement. In addition, the metallic foil seal is able to conform to any irregularities in the face surface of the seal plate, e.g., waviness, and to accommodate runout of the seal plate face surface.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:
1. A fluid seal device for preventing a flow of fluid through a mechanism comprising:
 (a) a thin, flexible sealing element;
 (b) a relatively rigid sealing plate having a groove in a face surface of the plate;
 (c) said flexible sealing element being disposed in confronting, closely spaced relation to the face surface of the sealing plate;
 (d) said sealing element and said sealing plate in their confronting, closely spaced relation being disposed so that fluid flow must be through the space between them;
 (e) means for causing relative movement between said sealing element and said sealing plate whereby the sealing element in moving relative to the sealing plate increases the pressure in the sealing space between the sealing element and the grooved sealing plate to at least the pressure of the fluid to be sealed so as to prevent through fluid flow; and
 (f) each of said grooves having a portion closest to the fluid lagging behind the portions furthest from said fluid as taken in relation to the relatively moving flexible sealing element so that fluid entering said sealing space is moved back towards said fluid.

2. A device as claimed in claim 1 wherein said groove is on a low pressure side of the sealing plate and in communication with a high pressure side of the plate whereby the pressure in the sealing space between the sealing element and the sealing plate does not exceed the high pressure.

3. The device of claim 1 wherein said sealing element rotates relative to the sealing plate and the groove is arranged in a spiral around the center of rotation.

4. A fluid seal comprising:
 (a) a housing member defining a chamber containing fluid to be sealed therein;
 (b) a rotatable shaft member extending through the chamber and being rotatably journaled in said housing member;
 (c) first and second sealing elements being closely spaced and extending around said shaft;
 (d) one of said elements being fixed to said housing, the other of said sealing elements being fixed to said shaft so as to be rotatable with the shaft and relative to said one sealing element;
 (e) one of said sealing elements being flexible and the other of said sealing elements having at least one groove facing the flexible sealing element;
 (f) said sealing elements being orientated so that the space between them communicates with said chamber; and,
 (g) each such groove having their portions closest to said chamber lagging behind their portions furthest from said chamber as taken in relation to the relatively moving flexible sealing element so that fluid entering said sealing space from said chamber is moved back toward said chamber.

5. The seal of claim 4 wherein the flexible sealing element is fixed to said shaft.

6. The apparatus of claim 4 wherein interface surfaces of the sealing elements extend in generally radial directions relative to the axis of rotation of said shaft.

7. The apparatus of claim 5 wherein each such groove extends spirally toward the fluid containing chamber.

8. The sealing device of claim 4 wherein a plurality of fluid conveying grooves are provided and extend from near the center of said plate toward the outer periphery of the plate at non-radian angles relative to the center of rotation.

9. A fluid seal comprising:
(a) housing means defining a chamber containing the fluid to be sealed therein;
(b) said housing means having an outlet opening communicating with the chamber;
(c) an annular seal plate means carried by said housing means and extending around said opening, said seal plate means having grooves around said opening;
(d) a flexible disc element being disposed in closely spaced, confronting relation to the seal plate means;
(e) rotatable means connected to said flexible disc element for causing angular rotation of the disc element relative to the sealing plate means in close proximity thereto; and
(f) the grooves in said seal plate means extending outwardly relative to a center of rotation of the flexible disc element and at an angle relative to a radius from the axis of rotation such that the portions of the grooves furthest from the center of rotation lead the portions of the groove closes to the center of rotation relative to the moving disc element.

10. The fluid seal of claim 9 wherein said disc element is a thin metallic foil disc.

11. The fluid seal of claim 10 wherein said metallic foil disc is on the order of 0.005 inch in thickness.

12. The fluid seal of claim 9 wherein the space between the disc and the seal plate is on the order of 0.005 inch.

References Cited

UNITED STATES PATENTS

| | | | |
|---|---|---|---|
| 842,639 | 1/1907 | Emden | 277—27 |
| 3,055,666 | 9/1962 | Moreno | 277—25 |
| 3,093,382 | 1/1963 | Macks | 277—74 X |
| 3,109,658 | 11/1963 | Barrett et al. | 277—96 X |
| 3,188,097 | 6/1965 | Cott | 277—95 X |

FOREIGN PATENTS 735,250   8/1955   Great Britain.

SAMUEL ROTHBERG, *Primary Examiner.*

U.S. Cl. X.R.

277—74, 95